United States Patent
Klein (10) Patent No.: US 11,710,258 B1
(45) Date of Patent: Jul. 25, 2023

(54) SYSTEMS AND METHODS FOR COMPRESSING THREE-DIMENSIONAL IMAGE DATA

(71) Applicant: Illuscio, Inc., Culver City, CA (US)

(72) Inventor: Alexandre Leuckert Klein, Novo Hamburgo (BR)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/159,354

(22) Filed: Jan. 25, 2023

(51) Int. Cl.
  *G06K 9/36* (2006.01)
  *G06T 9/00* (2006.01)
  *G06T 3/40* (2006.01)

(52) U.S. Cl.
  CPC . *G06T 9/00* (2013.01); *G06T 3/40* (2013.01)

(58) Field of Classification Search
  CPC .. G06T 9/00; G06T 3/40; G06T 9/001; G06T 9/002; G06T 15/00; G06T 15/005; G06T 15/08; G06T 17/00; G06T 17/005; G06T 17/20; G06T 2200/04; G06T 2207/20081; G06T 2207/20084
  See application file for complete search history.

(56) References Cited

U.S. PATENT DOCUMENTS

| | | | |
|---|---|---|---|
| 10,805,646 B2 | 10/2020 | Tourapis et al. | |
| 10,897,269 B2 | 1/2021 | Mammou et al. | |
| 11,461,935 B2 | 10/2022 | Mammou et al. | |
| 2019/0197739 A1* | 6/2019 | Sinharoy | G06T 7/55 |
| 2021/0183109 A1 | 6/2021 | Chevet et al. | |
| 2021/0375004 A1* | 12/2021 | Sugio | G06T 9/001 |
| 2021/0407148 A1 | 12/2021 | Flynn | |
| 2022/0239956 A1 | 7/2022 | Tourapis et al. | |
| 2022/0292730 A1* | 9/2022 | Gao | G06T 9/007 |
| 2023/0007303 A1* | 1/2023 | Iguchi | H04N 19/18 |

* cited by examiner

*Primary Examiner* — Duy M Dang
(74) *Attorney, Agent, or Firm* — Ansari Katiraei LLP; Arman Katiraei; Sadiq Ansari (57) ABSTRACT

Disclosed is a compression system for compressing image data. The compression system receives an uncompressed image file with data points that are defined with absolute values for elements representing the data point position in a space. The compression system stores the absolute values defined for a first data point in a compressed image file, determines a difference between the absolute values of the first data point and the absolute values of a second data point, derives a relative value for the absolute values of the second data point from the difference, and stores the relative value in place of the absolute values of the second data point in the compressed image file.

20 Claims, 8 Drawing Sheets

SYSTEMS AND METHODS FOR COMPRESSING THREE-DIMENSIONAL IMAGE DATA

BACKGROUND

A point cloud is a three-dimensional ("3D") image format that uses data points distributed in a 3D space to accurately model and/or represent the form and visual characteristics of a 3D object or scene. The point cloud contains millions or billions of data points to provide an accurate high-resolution representation of the modeled 3D object or scene. Each data point is defined with positional elements for the position of that data point in the 3D space, and with non-positional elements for the visual characteristics of the data point. Consequently, point cloud files and other 3D image files have large file sizes that require large amounts of storage (e.g., gigabytes) and large amounts of bandwidth in order to be transferred over a data network.

DETAILED DESCRIPTION OF PREFERRED EMBODIMENTS

The following detailed description refers to the accompanying drawings. The same reference numbers in different drawings may identify the same or similar elements.

Provided are systems and methods for compressing three-dimensional ("3D") image data. The systems and methods compress the 3D image data as a set of uncompressed absolute values for a select set of uncompressed image data and a set of compressed relative values for the set of compressed image data. The relative value for an instance of compressed image data is stored in a single data type, whereas the absolute values for an instance of uncompressed image are stored in two or more data types. The set of compressed relative values are used to regenerate the original uncompressed absolute values for the set of compressed image data by referencing the absolute values of an instance of uncompressed image data from the select set of uncompressed image data. In other words, the combination of a relative value from a compressed instance of image data and the reference to the absolute values of an uncompressed instance of image data is used to decompress the relative value back to the original uncompressed absolute values for the compressed instance of image data.

In some embodiments, the relative values specify a delta or differential value between the position or visual characteristics of a compressed first 3D construct and the position or visual characteristics of an uncompressed second 3D construct. For instance, the compression involves storing the set of positional coordinates or positional elements (e.g., x, y, and z values) of the second 3D construct in their original form as absolute values, and replacing the set of positional coordinates or positional elements (e.g., x, y, and z values) of the first 3D construct with a single value (e.g., the positional delta) that is derived from the positional difference between the first 3D construct and the second 3D construct. In some such embodiments, the compression may provide a 3 to 1 size reduction for the compressed 3D constructs as the 3 data types defined for storing each of the 3 positional elements may be replaced with the differential value that is stored in a single data type.

The compression techniques set forth herein are described with respect to point clouds. Point clouds are a 3D image format with constructs that are distributed in a 3D space in order to represent a 3D object, scene, and/or environment. The compression techniques apply to other 3D image formats that represent 3D objects, scenes, and/or environments with other constructs such as polygons and/or meshes.

Figure 1:
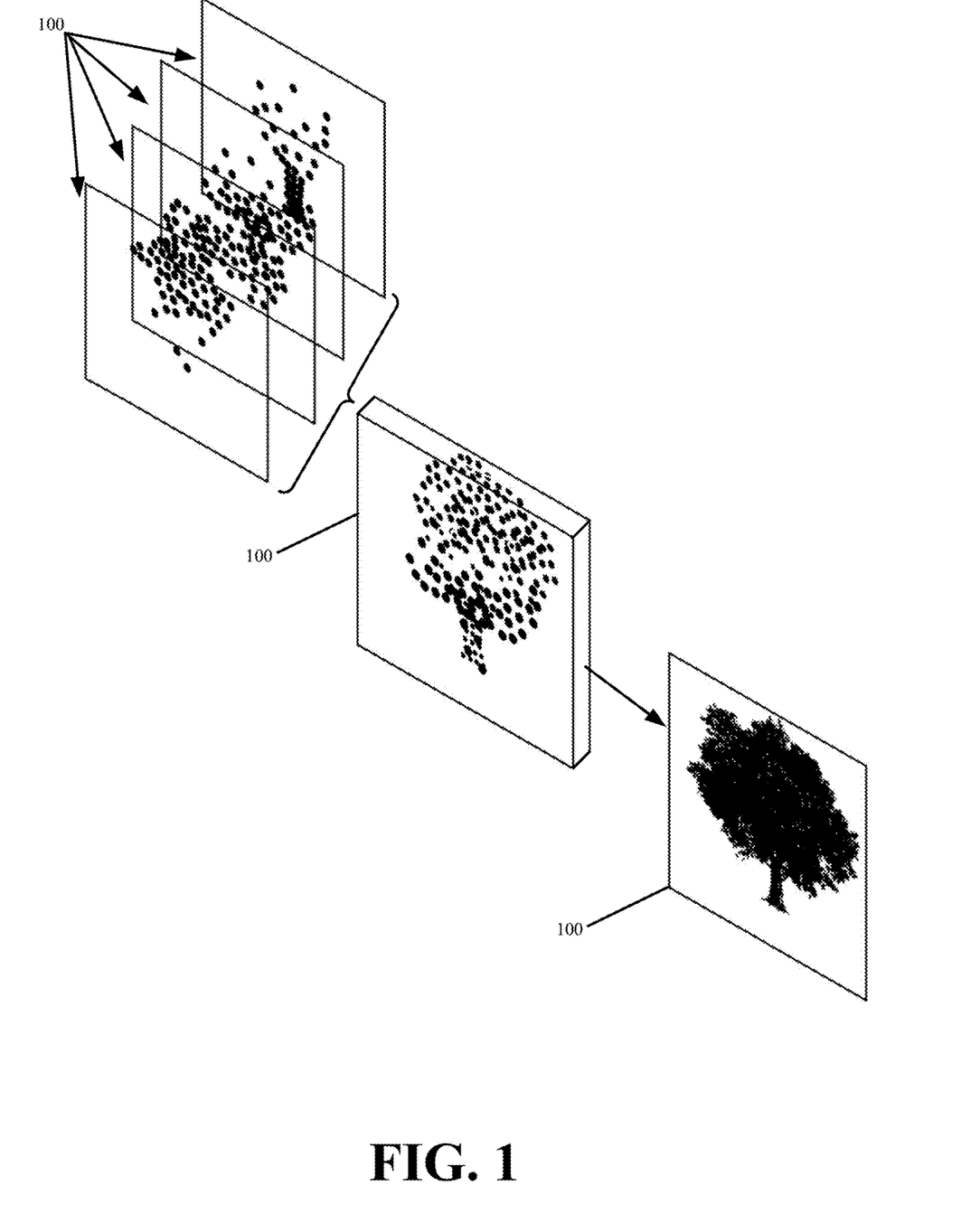
FIG. 1 illustrates an example point cloud with non-uniformly distributed data points or three-dimensional ("3D") constructs in accordance with some embodiments presented herein.

FIG. 1 illustrates an example point cloud 100 with non-uniformly distributed data points or 3D constructs in accordance with some embodiments presented herein. The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

Each point cloud data point or 3D construct of the point cloud includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Each element in the array of elements for each data point or 3D construct may be stored in a separate variable or data type. For instance, the x, y, and z positional elements may be stored as 3 separate 2-byte integers. Some elements may require more storage. For instance, each of the x, y, and z positional elements may be stored as separate 4-byte float data types.

Figure 2:
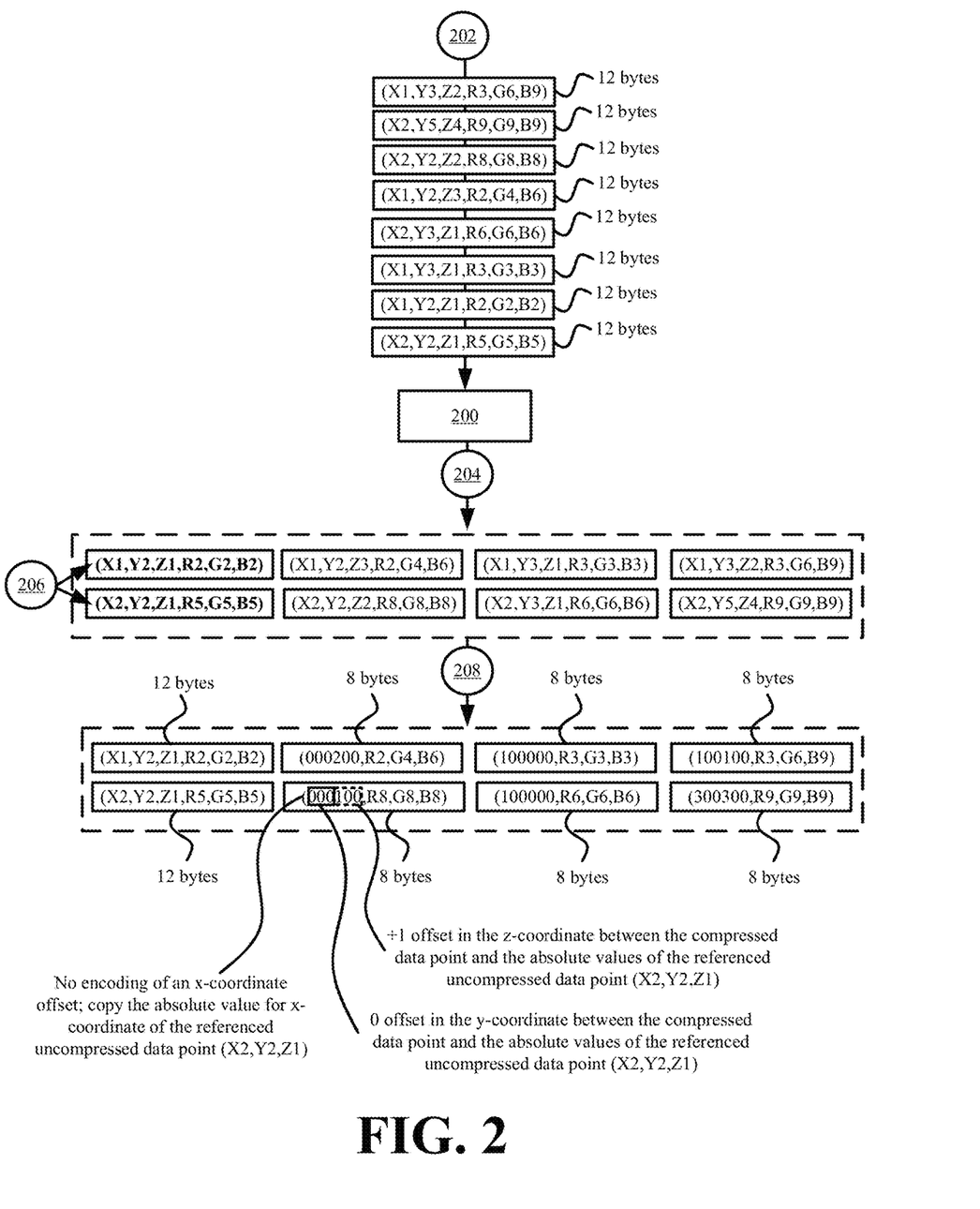
FIG. 2 illustrates an example of 3D image data compression using absolute and relative values in accordance with some embodiments presented herein.

FIG. 2 illustrates an example of the 3D image data compression using absolute and relative values in accordance with some embodiments presented herein. Compression system 200 receives (at 202) an uncompressed 3D file. The uncompressed 3D file may be a point cloud with data points or constructs that are distributed in a 3D space. Each data point or construct is defined with 3 positional elements and 3 non-positional elements, and each element is encoded as a 2-byte data type. Accordingly, each data point or construct consumes 12 bytes of storage.

Compression system 200 sorts (at 204) the data points according to their positional elements. In some embodiments, the sorting (at 204) includes organizing the data points according to increasing x-coordinate values, then y-coordinate values, and then z-coordinate values. In some embodiments, the sorting (at 204) includes grouping the sets of data points that are in the same x, y, or z-coordinate plane.

Compression system 200 selects (at 206) one or more of the sorted data points as a first set of uncompressed data points whose absolute values are used to compress other data points in the point cloud. In some embodiments, compression system 200 selects (at 206) and stores the absolute values for every Nth data point (e.g., $10^{th}$, $100^{th}$, etc.) in the sorted ordering. In some other embodiments, compression system 200 analyzes the stored data points to determine the number of reference points with absolute values that are needed to obtain a maximum compression or greatest reduction in file size. For instance, compression system 200 uses one or more artificial intelligence and/or machine learning ("AI/ML") techniques to determine which data points may be selected to have the smallest set of uncompressed data points that are stored with absolute values and the largest set of compressed data points that are stored with relative values.

Compression system 200 generates (at 208) a second set of compressed data points with relative values that reference the absolute values of one data point from the selected (at 206) first set of uncompressed data points. To generate (at 208) a compressed data point, compression system 200 calculates the difference between the absolute or uncompressed values for a set of elements of the compressed data point and the absolute or uncompressed values for the same set of elements of a closest uncompressed data point from the selected (at 206) first set of uncompressed data points in the sorted ordering. Compression system 200 replaces the absolute or uncompressed values for the set of elements of the compressed data point with the calculated difference. As shown in FIG. 2, compression system 200 replaces the 6 bytes required to store the absolute values for each of the x, y, and z positional elements of a compressed data point with a 2-byte relative value for the calculated difference in positioning between the compressed data point and a referenced uncompressed data point.

In some embodiments, the relative value is a vector. The vector represents a directional and distal offset from the referenced uncompressed data point whose absolute values were used to compute the relative value for the compressed data point. For instance, the uncompressed and compressed data points may be defined with the same x-coordinate position (because of the sorting and grouping of data points to the same plane) and different y and z-coordinate positions. The relative value defined for the compressed data point replaces the x, y, and z coordinates with a vector that corresponds to the direction and magnitude of the y and z-coordinate offset between the uncompressed and compressed data points.

In some embodiments, the relative value is an encoded value that represents the delta, difference, or offset between a set of elements of the uncompressed data point and the same set of elements of the compressed data point whose absolute values are referenced in order to generate the relative value for the set of elements of the uncompressed data point. For instance, the relative value may be a 9 digit value with the first 3 digits representing a x-coordinate offset, the next 3 digits representing a y-coordinate offset, and the last 3 digits representing a z-coordinate offset. As shown in FIG. 2, the sorting (at 204) allows compression system 200 to generate relative values for the compressed data points that exclude or do not encode an x-coordinate offset because the compressed data points share the same x-coordinate value as the referenced uncompressed data point, and that include a 6 digit value that encodes the y-coordinate offset between the compressed data point and the referenced uncompressed reference point in the first 3 digits and the z-coordinate offset between the compressed data point and the referenced uncompressed reference point in the last 3 digits.

Other encoding techniques for generating the relative values of the compressed data points are described below. In any case, the relative value requires fewer bytes to represent any set of elements (e.g., positional elements or non-positional element) of a data point than the absolute or original values stored for those same set of elements. Although the examples presented herein apply the compression to image data of 3D image formats, the compression may also be applied to pixels and/or other image data of 2D image formats. For instance, the x and y coordinates for pixels of a 2D image correspond to the absolute values, and the 2D image data may be compressed as a smaller first set of pixels that are defined with absolute values and a larger second set of pixels that are defined with relative values that are derived from the absolute value of one uncompressed pixel in the smaller first set of pixels.

The sorting (at 204) of the data points further identifies the uncompressed data point that serves as the reference point with absolute values for decompressing the relative value of a compressed data point. For instance, the relative value of a compressed data point references the absolute values of an uncompressed data point that is before or after the compressed data point in the sorted ordering.

Figure 3:
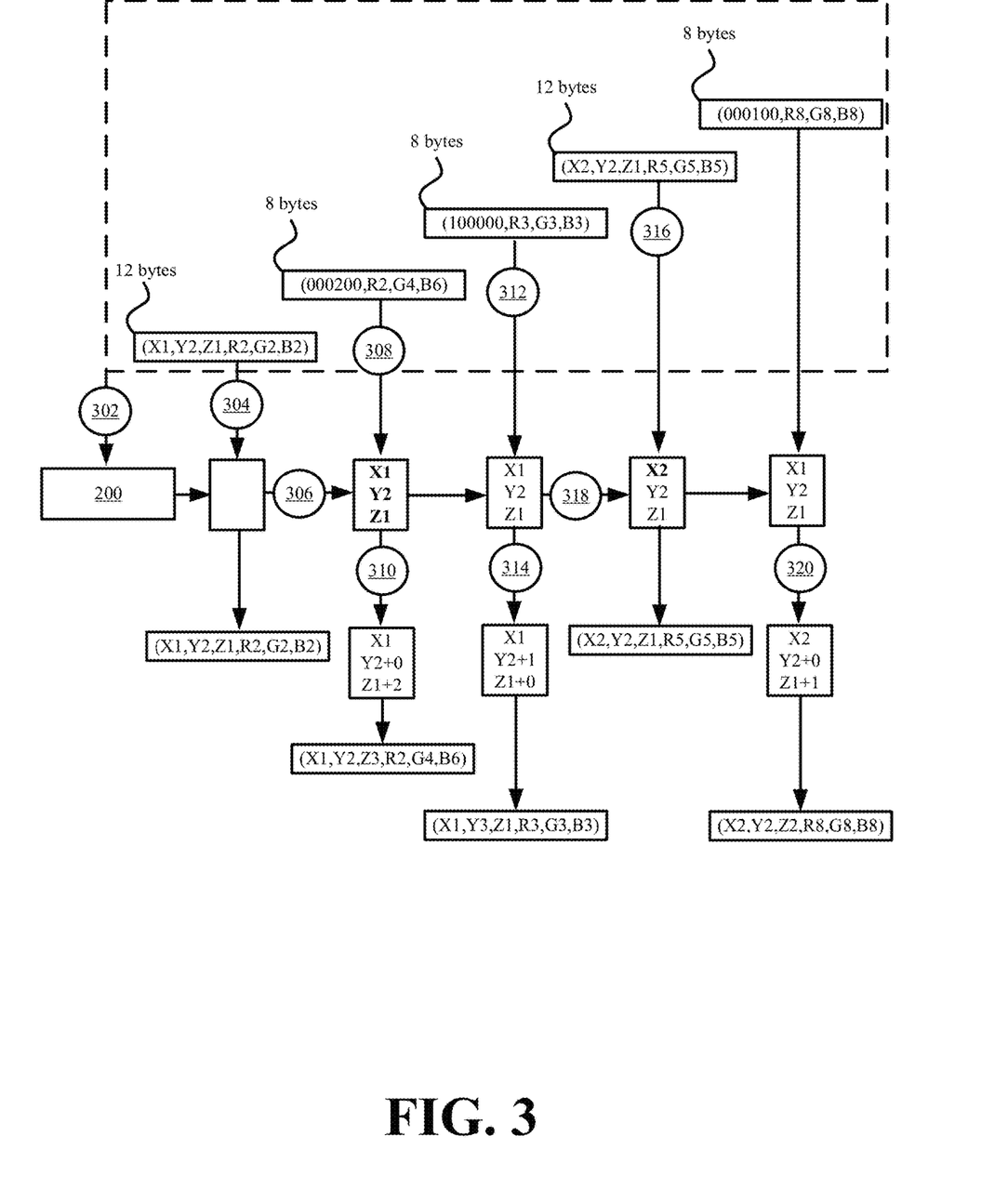
FIG. 3 illustrates an example of decompressing relative values of compressed 3D image data using absolute values of uncompressed 3D image data from the same file in accordance with some embodiments presented herein

FIG. 3 illustrates an example of decompressing relative values of compressed 3D image data using absolute values of uncompressed 3D image data from the same file in accordance with some embodiments presented herein. Compression system 200 receives (at 302) a compressed file with an uncompressed first set of data points and a compressed second set of data points intermixed in a sorted order.

Compression system 200 selects (at 304) a first data point from the sorted ordering of the compressed file, and determines that the first data point is an uncompressed reference data point that is encoded with absolute values. Compression system 200 buffers (at 306) the absolute values to use as reference data for decompression of the compressed data points. Compression system 200 outputs the first data point with the absolute values without having to perform any decompression of the first data point.

Compression system 200 selects (at 308) a second data point from the sorted ordering of the compressed file, and determines that the second data point is a compressed data point that is encoded with a relative value in place of absolute values for at least one set of elements (e.g., one relative value for the x, y, and z positional elements). Compression system 200 decompresses (at 310) the relative value into absolute values by adjusting the buffered absolute values of the first data point according to the offsets or vector encoded as the relative value of the compressed second data point. In this example, compression system 200 decodes and outputs the absolute values for the positional elements of the second data point by retaining the buffered absolute value for the x-coordinate positional element, adjusting the buffered absolute value for the y-coordinate positional element based on a y-coordinate offset encoded in the first 3 digits of the relative value, and adjusting the buffered absolute value for the z-coordinate position element based on a z-coordinate offset encoded in the last 3 digits of the relative value.

Compression system 200 selects (at 312) a third data point from the sorted ordering of the compressed file, and determines that the third data point is also a compressed data point that is encoded with a relative value instead of absolute values for the set of positional elements. Accordingly, compression system 200 uses the buffered absolute values of the first data point to decompress (at 314) the relative value of the third data point into the original absolute values defined for the third data point. Once again, compression system 200 adjusts the buffered absolute values of the reference first data point based on the offsets encoded as part of the relative value of the third data point.

Compression system 200 selects (at 316) a fourth data point from the sorted ordering of the compressed file, and determines that the fourth data point is an uncompressed data point that is encoded with absolute values and no relative values. Compression system 200 buffers (at 318) the absolute values of the fourth data point to use as reference data for decompression of compressed data points that come after (e.g., are sorted and/or stored after) the fourth data point in the compressed file. For instance, compression system 200 uses the buffered absolute values of the fourth data point to decompress (at 320) the relative value of a fifth data point, that is stored after the fourth data point in the compressed file, into the original absolute values defined for the fifth data point.

The compression and decompression using absolute and relative values may be applied to non-positional elements as well as positional elements. For instance, compression system 200 may store absolute values for the RGB elements of a first set of uncompressed data points, and may store a relative value for the RGB elements of a second set of compressed data points, wherein the relative value encodes different offsets that apply to the absolute values for each of the RGB elements of a particular uncompressed data point from the first set of uncompressed data points.

In some embodiments, compression system 200 partitions the space spanned by a point cloud or 3D image into subdivided regions, and selects one data point within each subdivided region to serve as the reference point against which the relative value for the compressed data points in that subdivided region are defined. In some such embodiments, compression system 200 maps the space within a particular subdivided volume to a set of values that are offset from the absolute values of a particular uncompressed data point selected for that particular subdivided volume.

Figure 4:
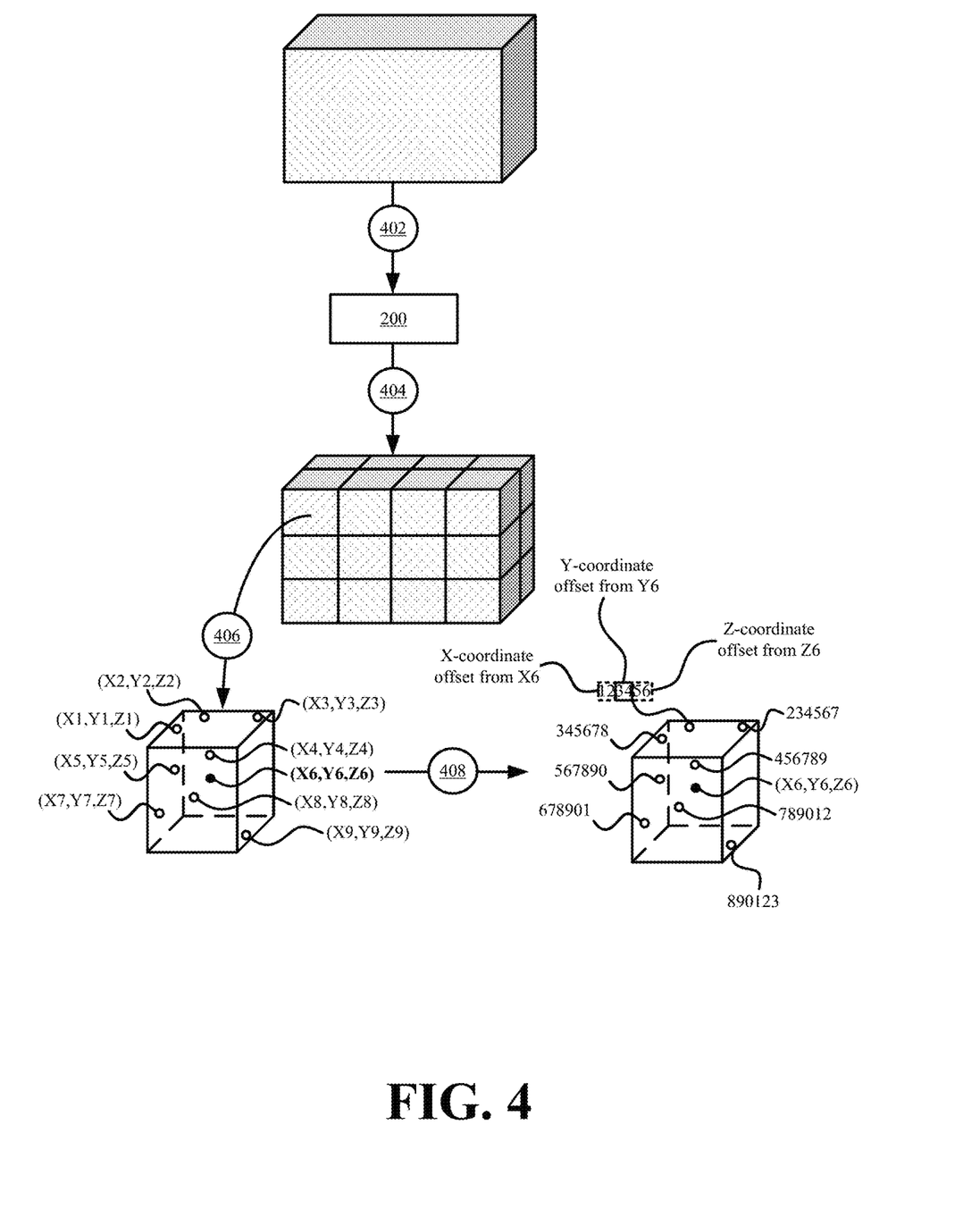
FIG. 4 illustrates an example of compressing data points in a subdivided region of a 3D image with relative values that map to positions within that subdivided region that are offset from the absolute values of an uncompressed data point in that subdivided region.

FIG. 4 illustrates an example of compressing data points in a subdivided region of a 3D image with relative values that map to positions within that subdivided region that are offset from the absolute values of an uncompressed data point in that subdivided region. Compression system 200 receives (at 402) a 3D image with data points or 3D constructs that are distributed within a large volume or space. Specifically, the data points are defined at different positions within the entire volume or space spanned by the 3D image. The entire volume or space may span a first range of x, y, and z coordinates and may include millions or billions of possible positions or x, y, and z value combinations.

Compression system 200 subdivides (at 404) the space into smaller regions that span a smaller second range of x, y, and z coordinates. In some embodiments, compression system 200 subdivides (at 404) the space into regions with possible spatial positions or x, y, and z value combinations that may be represented by a single 2-byte or 4-byte data type. For instance, compression system 200 may subdivide the space into a first region in which the total combination of x, y, and z positions is equal to or less than 65,536 or the value set of a 2-byte integer data type.

In some other embodiments, compression system 200 subdivides (at 404) the space based on other criteria. For instance, compression system 200 analyzes the distribution of data points across the space covered by the 3D image, and subdivides (at 404) the space into regions that maximize the total compression of the data.

To maximize the total compression, compression system 200 subdivides (at 404) the space so that each region contains a single uncompressed data point whose absolute values are used for compressing a maximum number of compressed data points. When the relative value is defined as a vector or positional offset, the constraint is defined as the maximum amount of distance separating a compressed data point from an uncompressed data point that may be defined by the relative value. Accordingly, compression system 200 subdivides (at 404) the space based on the distribution of the data points in a manner that maximizes the number of data points that are within a threshold or the maximum amount of distance from one another, wherein the maximum amount of distance corresponds to the maximum value that may be defined for the relative value (e.g., vector or positional offset separating a compressed data point from an uncompressed reference data point).

Compression system 200 selects (at 406) a single data point within each subdivided region to be the uncompressed reference point for that region and/or to provide the absolute values for compressing the absolute values of other data points in that region to relative values. In some embodiments, compression system 200 selects (at 406) the uncompressed reference point in a particular subdivided region to be the data point that is at the center of that particular subdivided region or at the center of the distribution of the data points within that particular subdivided region. In some other embodiments, compression system 200 selects (at 406) the uncompressed reference point as the first data point in the particular subdivided region. The first data point may correspond to the data point in the upper left corner of the particular subdivided region, the first data point after sorting the data points in the particular subdivided region, or the data point with the smallest x, y, and/or z coordinate values in the particular subdivided region.

Compression system 200 compresses (at 408) the absolute values for other data points in the particular subdivided region into a relative value that is defined relative to the absolute values of the selected (at 406) uncompressed reference point. In some embodiments, compressing (at 408) the absolute values includes calculating the direction and distance separating each compressed data point from the uncompressed reference point, and defining the relative value as a 1 or 2-byte vector or an encoded value that represents the calculated direction and distance separating the compressed data point from the position of the uncompressed reference point. For example, a relative value that is defined as a 2-byte vector may encode the angle and/or direction separating the compressed data point from the uncompressed reference point in the first byte of the vector and the distance separating the compressed data point from the uncompressed reference point in the second byte. The 2-byte vector can be decompressed back to original absolute values defining the position of the compressed data point by adjusting the absolute values representing the position of the uncompressed reference point by the directional and distal offset of the vector. As another example, a relative value may encode the x-coordinate offset separating a compressed data point from the uncompressed reference point in a first set of bits of the relative value, the y-coordinate offset separating the compressed data point from the uncompressed reference point in a second set of bits of the relative value, and the z-coordinate offset separating the compressed data point from the uncompressed reference point in a third set of bits of the relative value such that the absolute values representing the x, y, and z coordinates of the compressed data point in separate 2-byte data type are replaced with the single 2-byte data type of the relative value.

Figure 5:
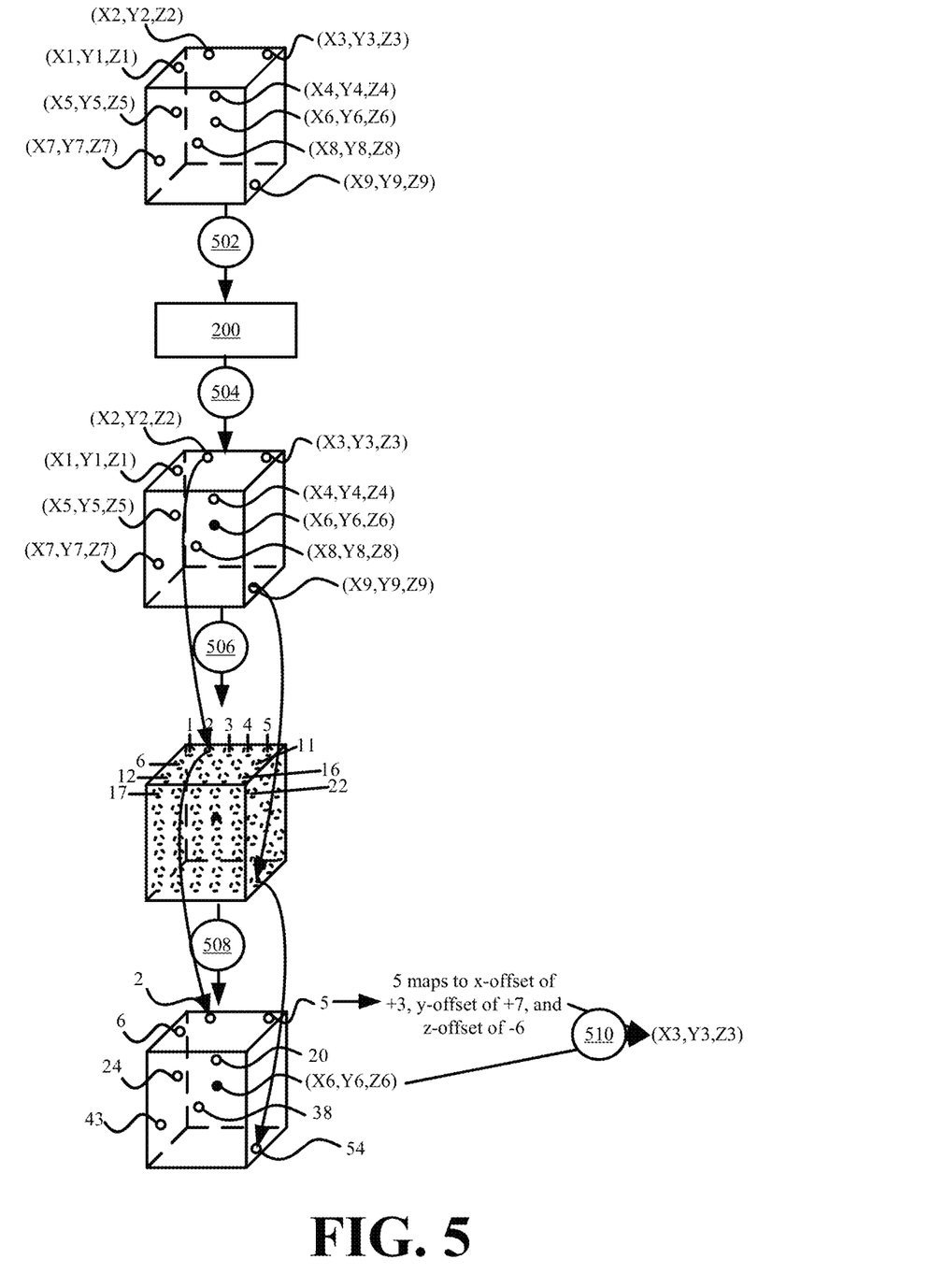
FIG. 5 illustrates an example of defining the position of the compressed data points in a particular subdivided region as a relative value to a mapped or possible position within the particular subdivided region in accordance with some embodiments.

In some embodiments, compressing the absolute value includes defining the relative values as possible positions in a particular subdivided region that are offset from the position of the uncompressed reference point, mapping the position of each compressed data point to one of the relative values, and replacing the absolute values for the positioning of the compressed data point with the mapped relative value. FIG. 5 illustrates an example of defining the position of the compressed data points in a particular subdivided region as a relative value to a mapped or possible position within the particular subdivided region in accordance with some embodiments.

Compression system 200 obtains (at 502) the absolute values that define the positions of a set of data points within a particular subdivided region of a 3D image. Compression system 200 selects (at 504) a data point to be the uncompressed reference point whose absolute values will be used to generate the relative values for compressing the other data point in the set of data points and/or for converting the relative values of the compressed data points back to their original absolute values.

In some embodiments, compression system 200 subdivides the space of the 3D image into equal or different sized volumes or regions that are each centered on a different data point. In some such embodiments, compression system 200 selects the data point from the set of data points in the particular subdivided region that is at the center of that particular subdivided region to be the uncompressed reference point.

In some other embodiments, compression system 200 subdivides the space of the 3D image into equal or different sized volumes or regions with a particular corner (e.g., the top left corner) of each region being positioned on a different data point. In some such embodiments, compression system 200 selects the data point at the particular corner of the particular subdivided region to be the uncompressed reference point.

Compression system 200 defines (at 506) relative positional values as a grid of possible positions within the particular subdivided region. Each relative positional value may be a single integer value that maps to a different x, y, and z position within the particular subdivided region, and the relative positional values for each x, y, and z combination may be assigned based on their position relative to the absolute values of the selected (at 504) uncompressed reference point. For instance, the relative positional value of 1 maps to a first x, y, and z coordinate offset from the absolute positional values of the uncompressed reference point at the center of the particular subdivide region, and the relative positional value of 22 maps to a different x, y, and z coordinate offset from the absolute positional values of the uncompressed reference point at the center of the particular subdivide region.

In some embodiments, compression system 200 subdivides the space of the 3D image so that all possible combinations of x, y, and z coordinates within each subdivided region can be represented by a different value of a 2-byte data type. Accordingly, compression system 200 may subdivide the 3D image into distinct regions that each have 65,536 possible positions and/or that compress a maximum of 65,535 data points for every one uncompressed data point in each subdivided region. Moreover, compression system 200 may subdivide the space of the 3D image so that the mapping of the relative values and/or the offsets represented by each relative value to the absolute values of the uncompressed reference point in each subdivided region are the same.

Compression system 200 compresses (at 508) the other data points within the particular subdivided region by mapping the absolute values of their positional elements to a defined (at 506) relative positional value at the same position in the particular subdivided volume. Compression system 200 stores the compressed data in a format that facilitates the decompression of the same data. For instance, compression system 200 stores the absolute values for the uncompressed reference point of the particular subdivided region before the relative values for the compressed data points of the same particular subdivided region.

Since the relative values of each subdivided region maps to the same or specific offsets in that subdivided region. Compression system 200 decompresses (at 510) the relative values stored for the compressed data points back to the absolute values for those data points by obtaining the absolute values for the uncompressed reference point of the particular subdivided region, and by adjusting the absolute values of the uncompressed reference point by the offset that is mapped to the relative value of a compressed data point in order to derive the absolute values for the positional elements of that compressed data point.

In some embodiments, compression system 200 subdivides the space of a 3D image based on a tree-based representation of the data points or constructs for that 3D image. For instance, the 3D image may be encoded as a binary tree, octree, k-dimensional tree, or other tree structure.

The leaf nodes of the tree correspond to the individual data points or constructs of the 3D image. Each parent node at one or more layers of the tree above the leaf nodes is directly or indirectly linked to two or more leaf nodes, and represents the volume or region of space encompassed by the two or more leaf nodes linked to that parent node. Accordingly, compression system 200 may define the subdivided regions for compression based on the parent nodes at different layers of tree that span a desired number of data points or 3D constructs or that span a volume or region of a desired size for compression.

In some embodiments, compression system 200 uses one or more AI/ML techniques to dynamically subdivide the image into regions that maximize the number of compressed data points and/or the amount of image data that is compressed. The AI/ML techniques analyze the distribution of the uncompressed data (e.g., the absolute values of the image data) in order to identify dense clusters of image data in which the image data in a particular cluster is separated from a reference point or construct in that particular cluster by a less than a threshold distance. In some embodiments, the threshold distance is defined based on the maximum x, y, and z positional offsets that can be encoded in a relative value data type. Alternatively, the AI/ML techniques analyze the distribution of the uncompressed data in order to identify the sizing and placement of the regions about different uncompressed reference points that maximize the number of data points in each region that are compressed relative to the absolute values of the uncompressed reference point for that region.

Figure 6:
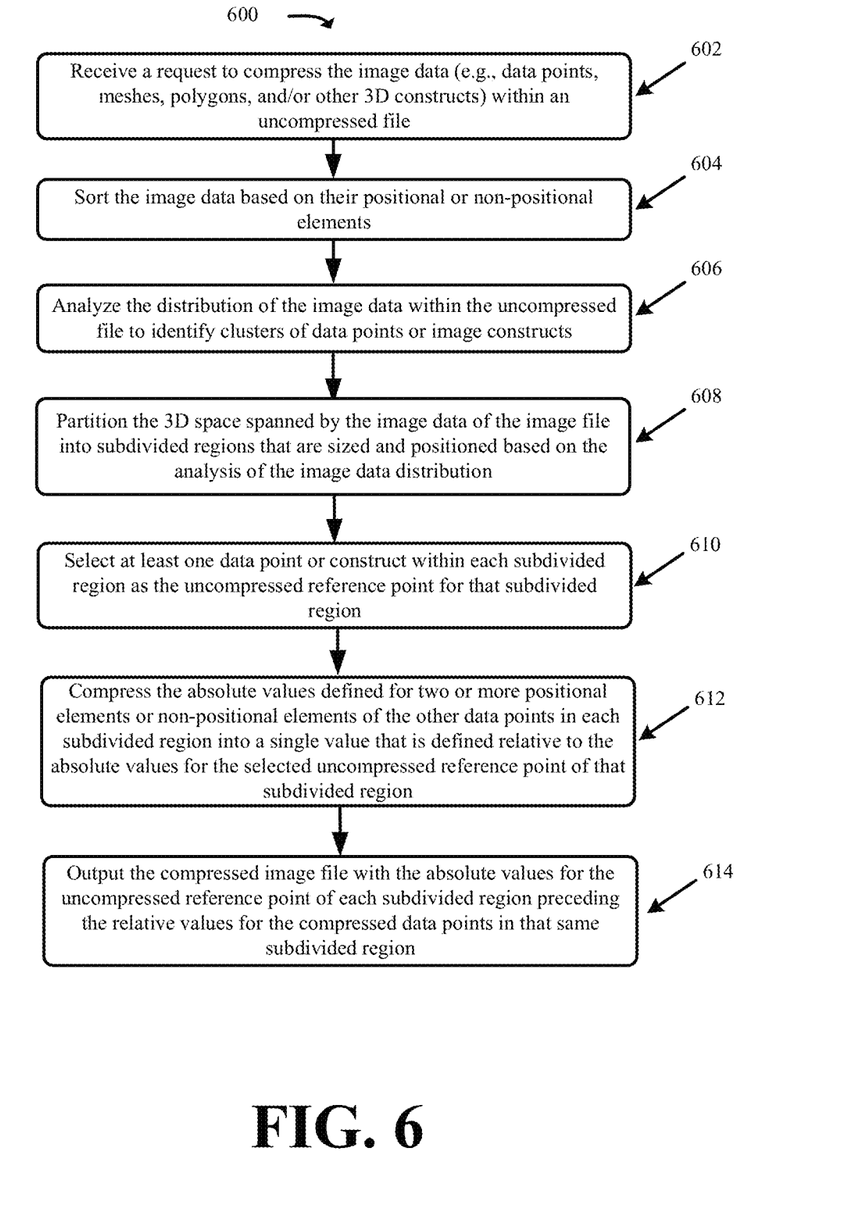
FIG. 6 presents a process for the compression of 3D image data using absolute and relative values in accordance with some embodiments presented herein.

FIG. 6 presents a process 600 for the compression of 3D image data using absolute and relative values in accordance with some embodiments presented herein. Process 600 is implemented by compression system 200.

Compression system 200 has one or more devices with processing, memory, storage, network, and/or other hardware resources that perform the compression and decompression of point clouds and/or other 3D image formats. Compression system 200 may run in conjunction with other devices or systems that access, edit, process, render, and/or otherwise interact with the compressed or uncompressed image files. For instance, a request may be issued on a user device to open a compressed point cloud file for editing within an image editing application. Compression system 200 processes the request by retrieving the compressed point cloud file, decompressing the relative values within the compressed point cloud file to the original absolute values, and passing the original absolute values and other uncompressed image data to the image editing application. Alternatively, a request may be issued to send a 3D image over a data network from a first device to a second device. Compression system 200 may be called on the first device to compress the uncompressed 3D image and reduce the amount of data that is transmitted over the data network, thereby reducing the total time and bandwidth needed to transfer the 3D image to the second device. Compression system 200 also runs on the second device to decompress the compressed 3D image back to the uncompressed 3D image.

Process 600 includes receiving (at 602) a request to compress the image data within an uncompressed file. The image data may include point cloud data points or other 3D constructs that are defined with absolute values for the positioning and visual characteristics of those data points or other constructs in a 3D space.

Process 600 includes sorting (at 604) the data points or constructs of the image data based on their positional or non-positional elements. The sorting (at 604) produces a uniform ordering of the data points or constructs to simplify the subsequent analysis and compression of the image data.

Process 600 includes analyzing (at 606) the distribution of the image data within the uncompressed file to identify clusters of data points or image constructs. Analyzing (at 606) the distribution of the image data includes comparing the absolute values defined for the positional elements of the data points, grouping different sets of data points together, and determining the grouping that has the largest number of data points within a threshold distance of the fewest number of reference points, wherein the threshold distance corresponds to the maximum positional offset or largest vector that may be defined with a relative value data type.

In some embodiments, the analysis (at 606) is performed using relative value data types of different sizes. For instance, the AI/ML techniques are used to determine a first optimal grouping for representing the offsets between the data points and the reference points with a maximum of 1 byte, a second optimal grouping for representing the offsets between the data points and the reference points with a maximum of 2-bytes, and a third optimal grouping for representing the offsets between the data points and the reference points with a maximum of 4 bytes. The AI/ML techniques calculate the number of data points that can be compressed with each grouping and relative value data type and the space savings resulting from each.

Process 600 includes partitioning (at 608) the 3D space spanned by the image data of the image file into subdivided regions that are sized and positioned based on the analysis (at 606) of the image data distribution. Specifically, compression system 200 partitions (at 608) the image data into different sets of data points or constructs that are within different bounding boxes defined for the groups that have the largest number of data points within a threshold distance of the fewest number of reference points.

Process 600 includes selecting (at 610) at least one data point or construct within each subdivided region as the uncompressed reference point whose absolute values are used to define the relative values of the other data points or constructs in the same subdivided region that are subject to compression. The selection (at 610) of the uncompressed reference point may differ based on the compression technique that is performed. In some embodiments, partitioning (at 608) the 3D space includes defining each of the subdivided regions to be centered on one data point, and the center data point of each subdivided region is selected (at 610) as the uncompressed reference point. In some embodiments, compression system 200 selects (at 610) the uncompressed reference point to be one of the data points within each subdivided region that is no more than a threshold distance from all other data points in the subdivided region or that has the shortest offset from the furthest data point in the subdivided region. In some embodiments, partitioning (at 608) the 3D space includes defining a border or starting coordinate of each subdivided region on a particular data point, and selecting (at 610) that particular data point at the border or starting coordinate of the subdivided region as the uncompressed reference point for that subdivided region.

Process 600 includes compressing (at 612) the absolute values defined for two or more positional elements or non-positional elements of the other data points (e.g., the data points that are not selected as the reference point and that are subject to compression) in each subdivided region into a single value that is defined relative to the absolute values for the selected (at 610) uncompressed reference point of that subdivided region. Different relative values may be generated for the compressed data points depending on the compression technique that is used.

In some embodiments, compression system 200 compresses (at 612) the absolute values by computing the delta, difference, or positional offset between the absolute values of a data point that is being compressed in a particular subdivided region and the absolute values of the uncompressed reference point that was selected (at 610) for that particular subdivided region, and encoding the delta, difference, or positional offset as the relative value. The encoding involves storing two or more offsets for differences in two or more coordinates as single value or in a single variable or data type. As noted above, the offset for each of the two or more coordinates may be encoded in different bits or digits of the relative value or may be encoded using other encoding techniques.

In some embodiments, compression system 200 compresses (at 612) the absolute values by computing the direction and magnitude separating a data point that is being compressed in a particular subdivided region from the uncompressed reference point that was selected (at 610) for that particular subdivided region. Compression system 200 then defines the relative value as a vector that encodes the direction and magnitude.

In some embodiments, compression system 200 maps and/or assigns the possible positions (e.g., x, y, and z combinations) within each partitioned region to a different relative value within a range of values supported by the relative value type. For example, the relative value of 1 may be mapped to a position that increments the absolute value for the x-coordinate position of the uncompressed reference point by a value of 1, the relative value of 1000 may be mapped to a position that increments the absolute value for the y-coordinate position of the uncompressed reference point by a value of 1, the relative value of 1000000 may mapped to a position that increments the absolute value for the z-coordinate position of the uncompressed reference point by a value of 1, and the relative value of 9010080 may be mapped to a position that increments the absolute value for the x-coordinate position of the uncompressed reference point by a value of 80, the y-coordinate position of the uncompressed reference point by a value of 10, and the z-coordinate position of the uncompressed reference point by a value of 9.

In any case, compressing (at 612) the absolute values involves replacing the two or more data types that store the absolute values with a single data type that stores the relative value that is generated from referencing the absolute values of the uncompressed reference point. For instance, compression system 200 may achieve 3-to-1 reduction in the data required to store the image data positions when a different 2-byte data type storing each of the x, y, and z coordinates of a data point is replaced with a single 2-byte data type storing the relative value for the positional offset between that data point and the uncompressed reference point. Even greater compression may be achieved when the absolute values are stored as separate 4-byte data types and the relative value is stored as a single 2-byte data type, or when the absolute values for non-positional elements, such as the RGB color values, are compressed to a relative value in a similar manner as the compression of the absolute values for the positional elements to a relative value.

Process 600 includes outputting (at 614) the compressed image file with the absolute values for the uncompressed reference point of each subdivided region preceding the relative values for the compressed data points in that same subdivided region. The compressed image format reduces the amount of metadata that compression system 200 needs to decompress the file and/or the processing effort required to decompress the compressed image data (e.g., compressed data points or 3D constructs).

Figure 7:
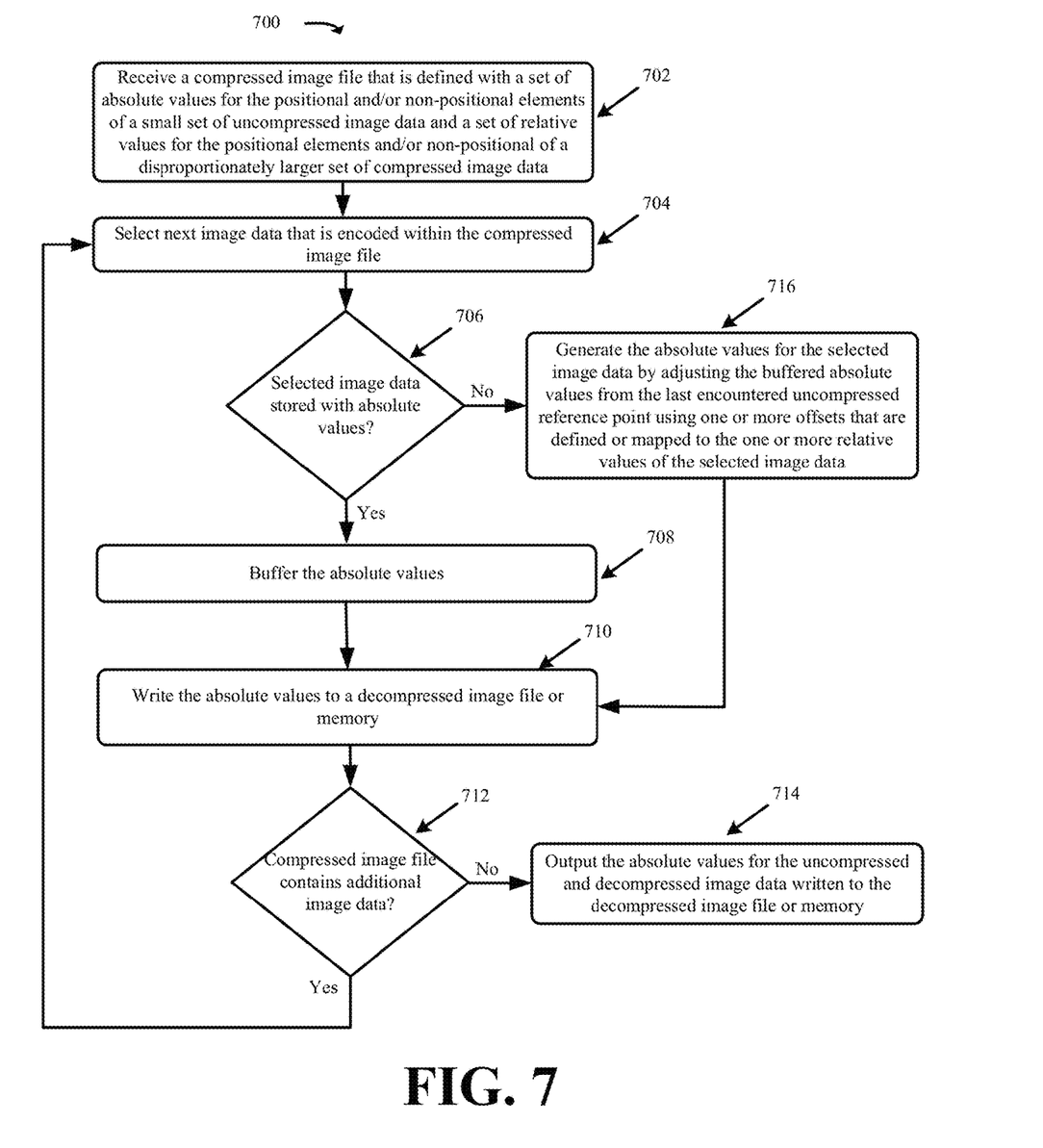
FIG. 7 presents a process for decompressing the compressed image files using the relative values of the compressed data points and the absolute values of the uncompressed reference points encoded in a compressed image file in accordance with some embodiments presented herein.

Compression system 200 also performs the decompression of the compressed image files and restores the absolute values for the compressed data points. FIG. 7 presents a process 700 for decompressing the compressed image files using the relative values of the compressed data points and the absolute values of the uncompressed reference points encoded in a compressed image file in accordance with some embodiments presented herein. Process 700 is implemented by compression system 200.

Process 700 includes receiving (at 702) a compressed image file that is defined with a set of absolute values for the positional and/or non-positional elements of a small set of uncompressed image data and a set of relative values for the positional elements and/or non-positional of a disproportionately larger set of compressed image data.

Process 700 includes selecting (at 704) next image data that is encoded within the compressed image file. As noted above, the compressed image file stores the uncompressed and compressed image data in a particular sequence. For instance, the absolute values of an uncompressed data point may precede the relative values of all compressed data points that are derived from or based on the absolute values of that uncompressed data point.

Process 700 includes determining (at 706) if the selected image data is stored with absolute values or relative values. Compression system 200 analyzes the encoding of the selected image data to determine if the selected image data corresponds to an uncompressed reference point or a compressed data point.

In response to determining (at 706—Yes) that the selected image data is stored with absolute values and is an uncompressed reference point, process 700 includes buffering (at 708) the absolute values to use for the decompression of compressed image data with relative values that were derived from the absolute values of the selected image data. Process 700 includes writing (at 710) the absolute values to a decompressed image file or memory. Process 700 determines (at 712) if the compressed image file contains additional compressed or uncompressed image data. If the compressed image file contains (at 712—Yes) additional image data, process 700 reverts to selecting (at 704) the next image data that is encoded within the compressed image file. Otherwise, process 700 terminates by outputting (at 714) the absolute values for the uncompressed and decompressed image data written to the decompressed image file or memory.

In response to determining (at 706—No) that the selected image data is stored with one or more relative values and is a compressed data point, process 700 includes generating (at 716) the absolute values for the compressed data point by adjusting the buffered (at 708) absolute values from the last encountered uncompressed reference point using one or more offsets that are defined or mapped to the one or more relative values of the compressed data point. For instance, compression system 200 decodes a relative value stored as part of the selected image data to a vector or two or more x, y, or z positional offsets, and applies the decoded vector or positional offsets to the buffered absolute values in order to derive the absolute values for the selected image data. Alternatively, compression system 200 determines the mapping between the relative value stored as part of the selected image data and an offset or position within the subdivided region of the selected image data, and computes the absolute values for the selected image data by adjusting the buffered absolute values according to the mapped offset or position. Process 700 includes writing (at 710) the absolute values to the decompressed image file or location in memory, and determining (at 712) if the compressed image file contains additional compressed or uncompressed image data.

Figure 8:
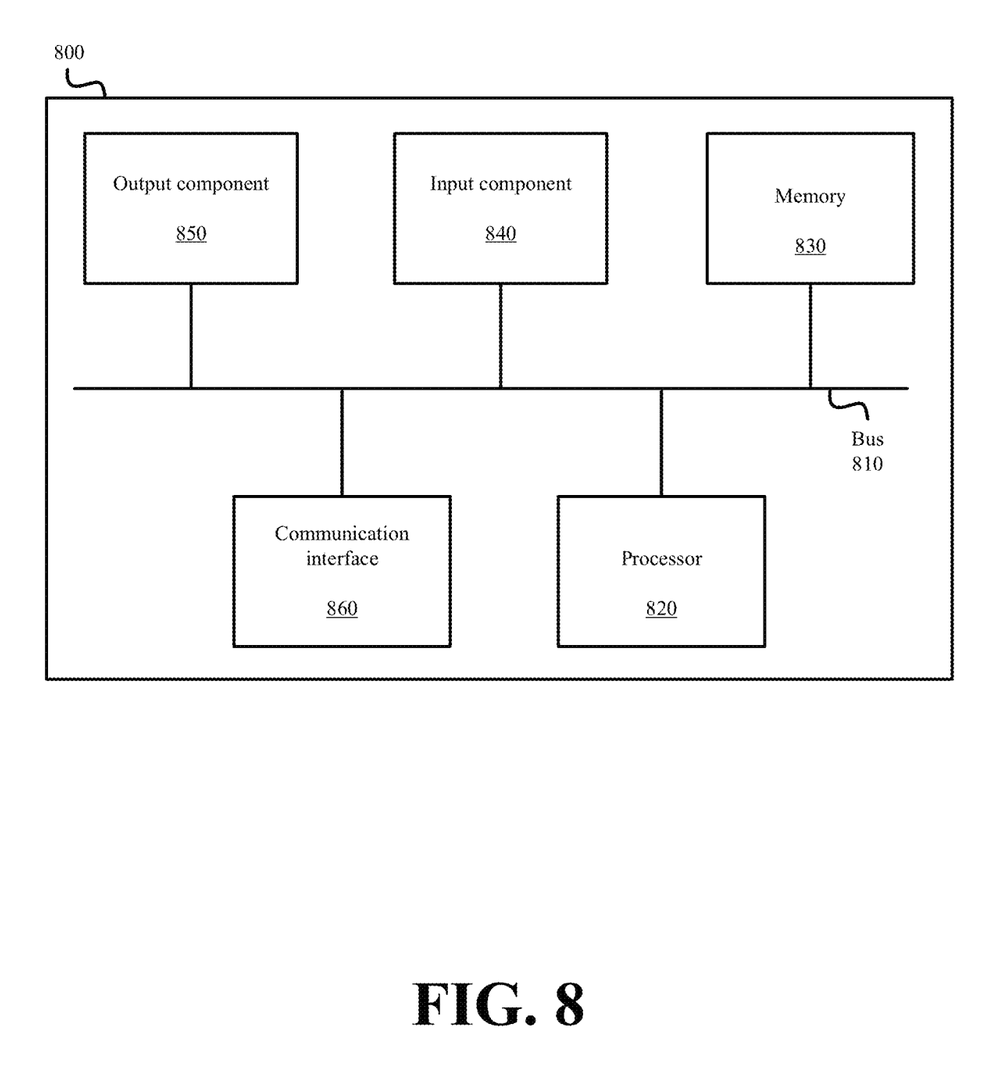
FIG. 8 illustrates example components of one or more devices, according to one or more embodiments described herein.

FIG. 8 is a diagram of example components of device 800. Device 800 may be used to implement one or more of the devices or systems described above (e.g., compression system 200). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving an uncompressed image file comprising a plurality of data points, wherein each data point of the plurality of data points is defined with absolute values for a plurality of elements that define a particular position of the data point in a space;
   selecting the absolute values of a first data point from the plurality of data points for compression of the absolute values of other data points from the plurality of data points;
   storing the absolute values of the first data point in a compressed image file;
   determining a difference between the absolute values of the first data point and the absolute values of a second data point from the plurality of data points;
   deriving a relative value for the absolute values of the second data point from the difference; and
   storing the relative value in place of the absolute values of the second data point in the compressed image file.

2. The method of claim 1,
   wherein storing the absolute values comprises storing each absolute value that is defined for a different element of the plurality of elements in a different data type or variable that is created for that different element; and
   wherein storing the relative value comprises storing the relative value in a single data type or variable that is defined for the second data point.

3. The method of claim 1, wherein deriving the relative value comprises:
   encoding a first difference in the absolute values defined for a first element of the plurality of elements of the first data point and the second data point to a first set of bits of the relative value; and
   encoding a second difference in the absolute values defined for a second element of the plurality of elements of the first data point and the second data point to a second set of bits of the relative value.

4. The method of claim 3 further comprising:
   decompressing the absolute values of the second data point from the relative value and the absolute values of the first data point stored in the compressed image file, wherein decompressing the absolute values comprises adjusting the absolute values defined for the first element and the second element of the first data point with the first difference and the second difference encoded to the relative value of the second data point.

5. The method of claim 1, wherein deriving the relative value comprises:
   defining a vector with a direction and a magnitude based on the difference; and
   encoding the vector as the relative value of the second data point.

6. The method of claim 1 further comprising:
   analyzing a distribution of the plurality of data points across the space;
   selecting a first set of the plurality of data points as uncompressed reference points for the compressed image file based on the distribution; and
   compressing a second set of the plurality of data points in the compressed image file based on the distribution.

7. The method of claim 1, wherein selecting the absolute values of the first data point comprises:
   selecting the first data point as an uncompressed reference point for compressing a set of the plurality of data points that are a maximum distance from the first data point, wherein the maximum distance is a maximum encoded value supported by a data type used to store the relative value.

8. The method of claim 1,
   wherein determining the difference comprises computing offsets in two or more coordinate planes separating the first data point from the second data point in the space; and
   wherein deriving the relative value comprises defining a single data type that encodes the offsets in the two or more coordinate planes.

9. The method of claim 1 further comprising:
partitioning the space into a plurality of subdivided regions;
selecting the first data point as a reference point in a particular subdivided region of the plurality of subdivided regions; and
compressing the absolute values defined for a set of the plurality of data points in the particular subdivided region into relative values that are derived from the absolute values of the first data point based on the first data point being selected as the reference point in the particular subdivided region.

10. The method of claim 1 further comprising:
partitioning the space into a plurality of subdivided regions;
defining a particular subdivided region of the plurality of subdivided regions that includes the first data point and the second data point based on the absolute values defined for the first data point;
mapping different positions in the particular subdivided region to different relative values; and
wherein deriving the relative value comprises replacing the absolute values defined for the second data point with the relative value from the different relative values that maps to a particular position in the particular subdivided region identified by the absolute values defined for the second data point.

11. The method of claim 10 further comprising:
converting the relative value to the absolute values defined for the second data point based on the particular position in the particular subdivided region represented by the relative value and the absolute values defined for the first data point.

12. The method of claim 1 further comprising:
sorting the plurality of data points according to the absolute values defined for each data point of the plurality of data points.

13. The method of claim 1, wherein storing the absolute values consumes more bytes in the compressed image file than storing the relative value.

14. The method of claim 1 further comprising:
generating different groupings of the plurality of data points;
analyzing each grouping of the different groupings;
determining a particular grouping of the plurality of data points that results in the compressed image file having a minimum number of uncompressed data points and a maximum number of compressed data points; and
selecting the first data point as an uncompressed data point of the compressed image file and the second data point as a compressed data point of the compressed image file based on the particular grouping.

15. The method of claim 1 further comprising:
determining a particular grouping of the plurality of data points that results in the compressed image file having a minimum number of uncompressed data points and a maximum number of compressed data points; and
partitioning the space into a plurality of subdivided regions that yield the particular grouping of the plurality of data points; and
compressing the absolute values defined for a first set of the plurality of data points, that are within a same first subdivided region as the first data point, into relative values that are derived from the absolute values defined for the first data point.

16. The method of claim 15 further comprising:
compressing the absolute values defined for a second set of the plurality of data points, that are within a same second subdivided region as a third data point of the plurality of data points, into relative values that are derived from the absolute values defined for the third data point.

17. The method of claim 1, wherein storing the relative value comprises:
writing the relative value for the second data point after the absolute values of the first data point in the compressed image file and before writing the absolute values of another data point to the compressed image file.

18. A compression system comprising:
one or more hardware processors configured to:
receive an uncompressed image file comprising a plurality of data points, wherein each data point of the plurality of data points is defined with absolute values for a plurality of elements that define a particular position of the data point in a space;
select the absolute values of a first data point from the plurality of data points for compression of the absolute values of other data points from the plurality of data points;
store the absolute values of the first data point in a compressed image file;
determine a difference between the absolute values of the first data point and the absolute values of a second data point from the plurality of data points;
derive a relative value for the absolute values of the second data point from the difference; and
store the relative value in place of the absolute values of the second data point in the compressed image file.

19. The compression system of claim 18,
wherein storing the absolute values comprises storing each absolute value that is defined for a different element of the plurality of elements in a different data type or variable that is created for that different element; and
wherein storing the relative value comprises storing the relative value in a single data type or variable that is defined for the second data point.

20. A non-transitory computer-readable medium storing program instructions that, when executed by one or more hardware processors of a compression system, cause the compression system to perform operations comprising:
receive an uncompressed image file comprising a plurality of data points, wherein each data point of the plurality of data points is defined with absolute values for a plurality of elements that define a particular position of the data point in a space;
select the absolute values of a first data point from the plurality of data points for compression of the absolute values of other data points from the plurality of data points;
store the absolute values of the first data point in a compressed image file;
determine a difference between the absolute values of the first data point and the absolute values of a second data point from the plurality of data points;
derive a relative value for the absolute values of the second data point from the difference; and
store the relative value in place of the absolute values of the second data point in the compressed image file.

* * * * *